(12) United States Patent
Seifert

(10) Patent No.: US 10,883,846 B2
(45) Date of Patent: Jan. 5, 2021

(54) VEHICLE COMMUNICATION SYSTEM WITH AREA CLASSIFIER

(71) Applicant: MAGNA ELECTRONICS INC., Auburn Hills, MI (US)

(72) Inventor: Heinz B. Seifert, Ortonville, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 190 days.

(21) Appl. No.: 16/110,243

(22) Filed: Aug. 23, 2018

(65) Prior Publication Data

US 2019/0063936 A1 Feb. 28, 2019

Related U.S. Application Data

(60) Provisional application No. 62/549,103, filed on Aug. 23, 2017.

(51) Int. Cl.
| | | |
|---|---|---|
| *G01C 21/34* | (2006.01) | |
| *G05D 1/02* | (2020.01) | |
| *G08G 1/04* | (2006.01) | |
| *H04L 29/08* | (2006.01) | |
| *G08G 1/0962* | (2006.01) | |

(Continued)

(52) U.S. Cl.
CPC ....... *G01C 21/3461* (2013.01); *G05D 1/0027* (2013.01); *G05D 1/0214* (2013.01); *G05D 1/0276* (2013.01); *G05D 1/0287* (2013.01); *G08G 1/04* (2013.01); *G08G 1/09623* (2013.01); *G08G 1/096838* (2013.01); *G08G 1/096844* (2013.01); *H04L 67/18* (2013.01); *H04L 67/20* (2013.01); *H04W 4/024* (2018.02);

(Continued)

(58) Field of Classification Search
CPC .... G01C 21/3461; H04W 4/46; H04W 4/024; H04W 4/44; H04W 4/90; G05D 1/0027; G05D 1/0214; G05D 1/0276; G05D 1/0287; G08G 1/04; G08G 1/09623; G08G 1/096838; G08G 1/096844; H04L 67/18; H04L 67/20
See application file for complete search history.

(56) References Cited

U.S. PATENT DOCUMENTS

| | | |
|---|---|---|
| 5,530,240 A | 6/1996 | Larson et al. |
| 5,668,663 A | 9/1997 | Varaprasad et al. |

(Continued)

*Primary Examiner* — Yazan A Soofi
*Assistant Examiner* — Naeem Taslim Alam
(74) *Attorney, Agent, or Firm* — Honigman LLP

(57) ABSTRACT

A communication system for multiple vehicles includes a non-vehicle-based communication device operable to receive communications from vehicle-based communication devices of multiple vehicles and to transmit communications to the vehicle-based communication devices of multiple vehicles. Responsive to an occupant of a vehicle of the multiple vehicles rating or classifying an area at which the vehicle is traveling, the vehicle-based communication device of that vehicle communicates the rating or classification to the non-vehicle-based communication device. The vehicle-based communication device of that vehicle also communicates geographical location information pertaining to the area that is rated or classified. The non-vehicle-based communication device communicates the rating or classification for that area to other vehicle-based communication devices of other vehicles.

18 Claims, 2 Drawing Sheets

(51) Int. Cl.
*G05D 1/00* (2006.01)
*H04W 4/46* (2018.01)
*H04W 4/024* (2018.01)
*H04W 4/44* (2018.01)
*G08G 1/0968* (2006.01)
*H04W 4/90* (2018.01)

(52) U.S. Cl.
CPC ............... *H04W 4/44* (2018.02); *H04W 4/46* (2018.02); *H04W 4/90* (2018.02)

(56) References Cited

U.S. PATENT DOCUMENTS

| | | | |
|---|---|---|---|
| 5,724,187 A | 3/1998 | Varaprasad et al. | |
| 6,329,925 B1 | 12/2001 | Skiver et al. | |
| 6,477,464 B2 | 11/2002 | McCarthy et al. | |
| 6,690,268 B2 | 2/2004 | Schofield et al. | |
| 6,693,517 B2 | 2/2004 | McCarthy et al. | |
| 6,909,361 B2 | 6/2005 | McCarthy et al. | |
| 7,004,593 B2 | 2/2006 | Weller et al. | |
| 7,038,577 B2 | 5/2006 | Pawlicki et al. | |
| 7,167,796 B2 | 1/2007 | Taylor et al. | |
| 7,184,190 B2 | 2/2007 | McCabe et al. | |
| 7,195,381 B2 | 3/2007 | Lynam et al. | |
| 7,249,860 B2 | 7/2007 | Kulas et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,308,341 B2 | 12/2007 | Schofield et al. | |
| 7,329,013 B2 | 2/2008 | Blank et al. | |
| 7,338,177 B2 | 3/2008 | Lynam | |
| 7,370,983 B2 | 5/2008 | DeWind et al. | |
| 7,446,650 B2 | 11/2008 | Scholfield et al. | |
| 7,580,795 B2 | 8/2009 | McCarthy et al. | |
| 7,581,859 B2 | 9/2009 | Lynam | |
| 7,626,749 B2 | 12/2009 | Baur et al. | |
| 7,720,580 B2 | 5/2010 | Higgins-Luthman | |
| 7,855,755 B2 | 12/2010 | Weller et al. | |
| 9,495,874 B1 * | 11/2016 | Zhu | B60W 30/09 |
| 2007/0010942 A1 | 1/2007 | Bill | |
| 2009/0006194 A1 | 1/2009 | Sridharan et al. | |
| 2011/0087427 A1 | 4/2011 | Liu | |
| 2012/0062743 A1 | 3/2012 | Lynam et al. | |
| 2012/0218412 A1 | 8/2012 | Dellantoni et al. | |
| 2013/0222592 A1 | 8/2013 | Gieseke | |
| 2013/0238366 A1 * | 9/2013 | Morgan | G08G 1/205 705/4 |
| 2014/0195213 A1 * | 7/2014 | Kozloski | H04W 4/70 703/8 |
| 2014/0218529 A1 | 8/2014 | Mahmoud et al. | |
| 2014/0278047 A1 * | 9/2014 | Bahl | G08G 1/167 701/301 |
| 2014/0375476 A1 | 12/2014 | Johnson et al. | |
| 2015/0124096 A1 | 5/2015 | Koravadi | |
| 2015/0158499 A1 | 6/2015 | Koravadi | |
| 2015/0251599 A1 | 9/2015 | Koravadi | |
| 2015/0352953 A1 | 12/2015 | Koravadi | |
| 2016/0036917 A1 | 2/2016 | Koravadi et al. | |
| 2016/0117926 A1 | 4/2016 | Akavaram et al. | |
| 2016/0210853 A1 | 7/2016 | Koravadi | |
| 2017/0036673 A1 * | 2/2017 | Lee | B60W 30/09 |
| 2018/0082315 A1 | 3/2018 | Smid et al. | |
| 2018/0204458 A1 * | 7/2018 | Fairfield | B60W 30/00 |

* cited by examiner

VEHICLE COMMUNICATION SYSTEM WITH AREA CLASSIFIER

CROSS REFERENCE TO RELATED APPLICATION

The present application claims the filing benefits of U.S. provisional application Ser. No. 62/549,103, filed, Aug. 23, 2017, which is hereby incorporated herein by reference in its entirety.

FIELD OF THE INVENTION

The present invention relates generally to a communication system for a vehicle and, more particularly, to a vehicle communication system that communicates with a remote server and/or with other vehicles.

BACKGROUND OF THE INVENTION

Driving assist systems and navigation systems are known. People tend to avoid areas they perceive as dangerous (e.g., blighted neighborhoods) and tend to gravitate to areas they perceive as pleasant (e.g., scenic routes) while driving. While the road system provides signs that qualify a route as 'scenic' there is no mechanism in place that allow people to avoid areas that are perceived as dangerous or undesirable.

SUMMARY OF THE INVENTION

The present invention provides a driving assistance system for a vehicle that includes a mechanism to allow people to rate a geographic area as desirable or undesirable based on their individual personal preferences. The information of the whole community is then used to direct autonomous vehicles to these areas or away from these areas. The system could also be used in non-autonomous vehicles equipped with a navigation system, and may provide an alert to the driver of the vehicle that the navigation route is or is not through a desirable or undesirable area.

These and other objects, advantages, purposes and features of the present invention will become apparent upon review of the following specification in conjunction with the drawings.

DESCRIPTION OF THE PREFERRED EMBODIMENTS

A vehicle driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction, or such as to contribute to an autonomous driving system of the vehicle. The system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
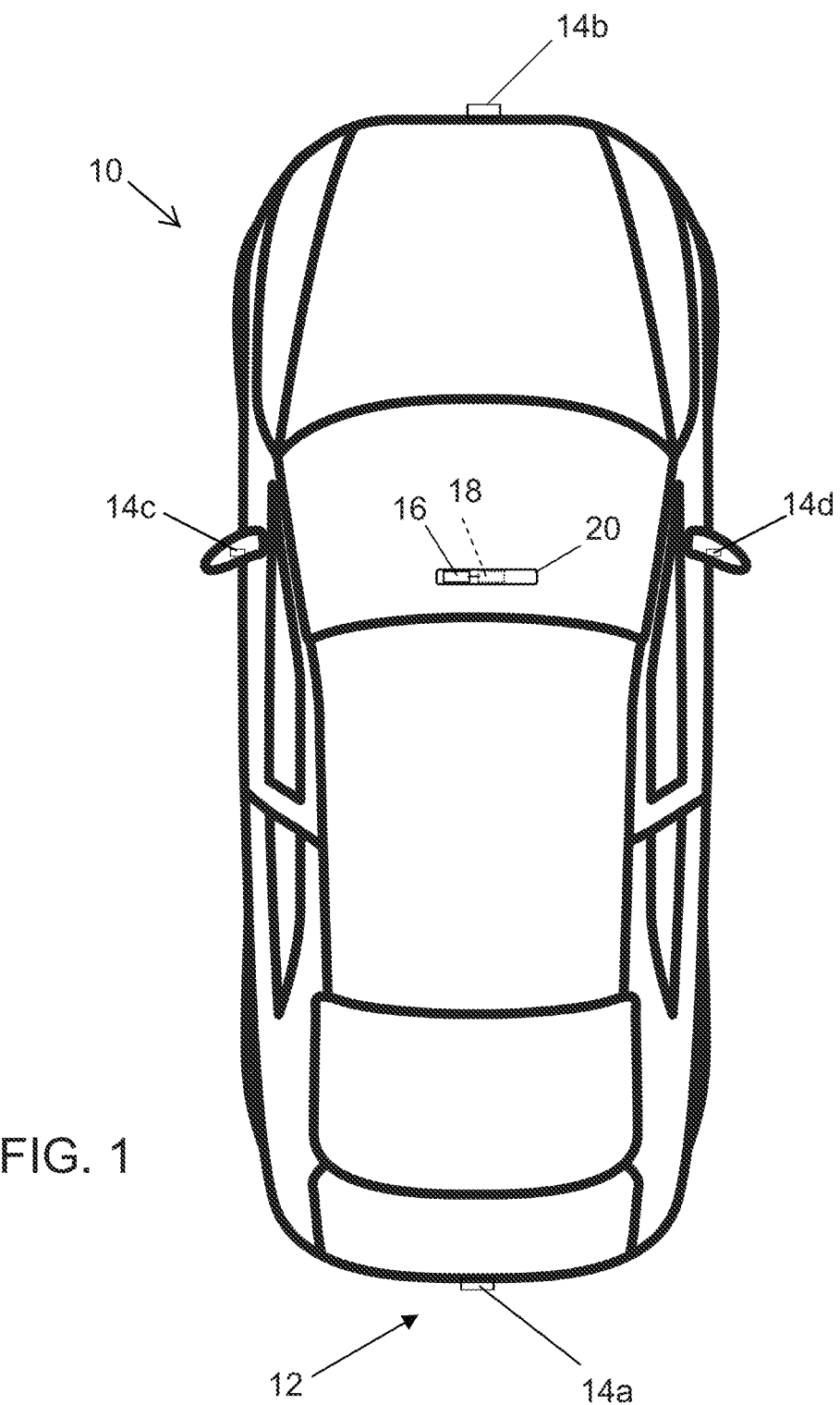
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver or occupant of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
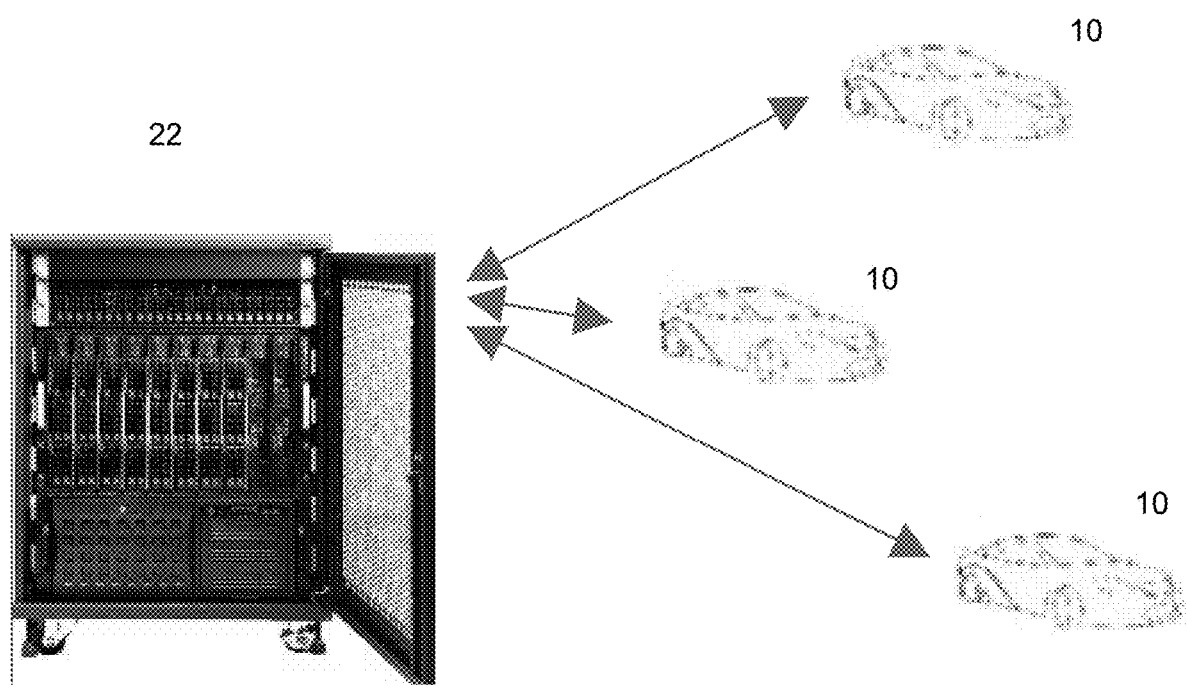
FIG. 2 is a schematic of a remote server communicating with communication systems of multiple vehicles.

The present invention comprises a system with communication devices of vehicles 10 outfitted with a HMI and Software, and a back-end server or remote server or non-vehicle-based server or communication device 22 that are connected through the Internet (FIG. 2). The HMI allows users in the vehicle to rate the area they are driving through using a suitable interface (e.g., a button push and then a voice input). The system may limit the classification to a preset list (e.g., scenic, unsafe, safe, accident, rude drivers, run-down, upscale) but would allow the user to add a freeform comment. The classification is then sent along with the GPS position of the vehicle and a user handle or identification or username (e.g., Facebook user or Twitter handle) and other data collected from the vehicle (e.g., images derived from image data captured by a camera of the subject vehicle) to the back-end server 22. The server 22 updates the user's social media data and stores the classification and location. The server geo-fences the location based upon the environment (in a city the area would be the size of a city block, on a country road it would be a longer stretch of highway possibly several miles long).

The driver or occupant of an autonomous vehicle or non-autonomous vehicle equipped with a navigation system can enable an option that allows route planning based on the criteria that the back-end server provides. The driver or occupant could select to avoid areas that other users consider unsafe, that have rude drivers or that are generally run down. The user could select to prefer areas designated by other users to be desired areas. The system would provide an update if an area is entered where the server has user ratings and could provide an average of the evaluations. The driver or occupant could then either confirm or reject the classification and add a comment. The system may utilize aspects of the systems described in U.S. Publication No. US-2018-

0082315, which is hereby incorporated herein by reference in its entirety. The rating or classification thus may be generated responsive to an input by an occupant of that vehicle (that rates the region based on information provided by the system or by personal observations). Optionally, communication system may generate the rating or classification, such as, for example, a rating or classification of a road condition (based on vehicle information or sensor inputs or geographical location information) or of a safe/unsafe area or the like (based on geographical location information) or the like.

Therefore, the present invention provides a communication system that allows a driver or occupant of a vehicle to "rate" or "classify" an area that they travel by or through. A remote server receives the rating or classification from multiple vehicle systems and communicates the rating or classification to other vehicles, such as when they are approaching a rated or classified area. The vehicle system receives the rating or classification and, if it is an autonomous vehicle, may alter its course toward or away from the area (depending on the rating/classification and depending on a user selected preference). If the vehicle that receives the rating/classification is a non-autonomous vehicle, the vehicle system (such as a navigation system of the vehicle) may generate an alert or the like to the driver or occupant as to the rating/classification of an area that the vehicle is approaching or may alter a designated route to proceed along or to avoid a rated/classified area (depending on the rating/classification and depending on a user selected preference for the navigation route).

For example, if the vehicle is proceeding along a route and there is a "scenic" area nearby (where one or more users had previously indicated that the area was scenic), but off of the prescribed route, the system may adjust the route (if the user had selected a preference for scenic routes) to follow the scenic route. Alternatively, if the vehicle is proceeding along a route and there is an "unsafe" area nearby (where one or more users had previously indicated that the area was unsafe), and along the prescribed route, the system may adjust the route (if the user had selected a preference to avoid such areas) to avoid the unsafe area.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0045812; US-2018-0015875; US-2017-0356994; US-2017-0315231; US-2017-0276788; US-2017-0254873; US-2017-0222311 and/or US-2010-0245066 and/or U.S. patent application Ser. No. 15/897,268, filed Feb. 15, 2018, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by an occupant of the vehicle, such as a driver of the vehicle, who may view the displayed images while normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A communication system for communicating between multiple vehicles, said communication system comprising:
a non-vehicle-based communication device operable to receive communications from vehicle-based communication devices of multiple respective vehicles and to transmit communications to the vehicle-based communication devices of the multiple respective vehicles;
wherein, responsive to generation at a first vehicle of the multiple vehicles of a rating or classification of an area in which the first vehicle is traveling, the vehicle-based communication device of the first vehicle communicates the generated rating or classification to the non-vehicle-based communication device;
wherein the vehicle-based communication device of the first vehicle also communicates geographical location information pertaining to the area that is rated or classified by the generated rating or classification;
wherein, responsive to receipt of the rating or classification and the geographical location information communicated by the vehicle-based communication device of the first vehicle, the non-vehicle-based communication device communicates the rating or classification for that area to other vehicle-based communication devices of other vehicles of the multiple vehicles; and
wherein, responsive to receipt of the rating or classification and the geographical location information communicated by the vehicle-based communication device of the first vehicle, the non-vehicle-based communication device geo-fences the area based upon an environment at and near the communicated geographical location.

2. The communication system of claim 1, wherein the rating or classification is generated responsive to an input by an occupant of the first vehicle.

3. The communication system of claim 1, wherein a control of the first vehicle generates the rating or classification.

4. The communication system of claim 1, wherein a vehicle control system autonomously controls a second vehicle of the multiple vehicles responsive to the vehicle-based communication device of the second vehicle receiving the communicated rating or classification for an area along a route of the second vehicle.

5. The communication system of claim 4, wherein the vehicle control system controls the second vehicle responsive to a user input that is indicative of a user preference for a driving route of the second vehicle.

6. The communication system of claim 1, wherein a vehicle navigation system adjusts a planned route for a second vehicle of the multiple vehicles responsive to the vehicle-based communication device receiving the communicated rating or classification from the non-vehicle-based communication device for an area at or near or along a route of the second vehicle.

7. The communication system of claim 6, wherein the vehicle navigation system of the second vehicle adjusts the route responsive to a user input that is indicative of a user preference for a driving route of the second vehicle.

8. The communication system of claim 1, wherein the vehicle-based communication device of the first vehicle communicates a user identification and other data collected from the first vehicle to the non-vehicle-based communication device.

9. A communication system for communicating between multiple vehicles, said communication system comprising:
a non-vehicle-based communication device operable to receive communications from vehicle-based communication devices of multiple respective vehicles and to transmit communications to the vehicle-based communication devices of the multiple respective vehicles;
wherein, responsive to generation at a first vehicle of the multiple vehicles of a rating or classification of an area in which the first vehicle is traveling, the vehicle-based communication device of the first vehicle communicates the generated rating or classification to the non-vehicle-based communication device;
wherein the vehicle-based communication device communicates a user identification and other data collected from the first vehicle to the non-vehicle-based communication device;
wherein the vehicle-based communication device of the first vehicle also communicates geographical location information pertaining to the area that is rated or classified by the generated rating or classification;
wherein, responsive to receipt of the rating or classification and the geographical location information communicated by the vehicle-based communication device of the first vehicle, the non-vehicle-based communication device communicates the rating or classification for that area to other vehicle-based communication devices of other vehicles of the multiple vehicles;
wherein a vehicle control system of a second vehicle of the multiple vehicles autonomously controls the second vehicle responsive to the vehicle-based communication device of the second vehicle receiving the communicated rating or classification from the non-vehicle-based communication device for an area along a route of the second vehicle; and
wherein, responsive to receipt of the rating or classification and the geographical location information communicated by the vehicle-based communication device of the first vehicle, the non-vehicle-based communication device geo-fences the area based upon an environment at and near the communicated geographical location.

10. The communication system of claim 9, wherein the rating or classification is generated responsive to an input by an occupant of the first vehicle.

11. The communication system of claim 9, wherein a control of the first vehicle generates the rating or classification.

12. The communication system of claim 9, wherein the vehicle control system controls the second vehicle responsive to a user input that is indicative of a user preference for a driving route of the second vehicle.

13. A communication system for communicating between multiple vehicles, said communication system comprising:
a non-vehicle-based communication device operable to receive communications from vehicle-based communication devices of multiple respective vehicles and to transmit communications to the vehicle-based communication devices of the multiple respective vehicles;
wherein, responsive to generation at a first vehicle of the multiple vehicles of a rating or classification of an area in which that vehicle is traveling, the vehicle-based communication device of the first vehicle communicates the generated rating or classification to the non-vehicle-based communication device;
wherein the vehicle-based communication device of the first vehicle also communicates geographical location information pertaining to the area that is rated or classified by the generated rating or classification;
wherein, responsive to receipt of the rating or classification and the geographical location information communicated by the vehicle-based communication device of the first vehicle, the non-vehicle-based communication device communicates the rating or classification for that area to other vehicle-based communication devices of other vehicles of the multiple vehicles;
wherein a vehicle navigation system of a second vehicle of the multiple vehicles adjusts a planned route for the second vehicle responsive to the vehicle-based communication device of the second vehicle receiving the communicated rating or classification from the non-vehicle-based communication device for an area along a route of the second vehicle; and
wherein, responsive to receipt of the rating or classification and the geographical location information communicated by the vehicle-based communication device of the first vehicle, the non-vehicle-based communication device geo-fences the area based upon an environment at and near the communicated geographical location.

14. The communication system of claim 13, wherein the rating or classification is generated responsive to an input by an occupant of that the first vehicle.

15. The communication system of claim 13, wherein a control of the first vehicle generates the rating or classification.

16. The communication system of claim 13, wherein a vehicle control system of the second vehicle autonomously controls the second vehicle responsive to the vehicle-based communication device of the second vehicle receiving the communicated rating or classification from the non-vehicle-based communication device for the area along the route of the second vehicle.

17. The communication system of claim 16, wherein the vehicle control system controls the second vehicle responsive to a user input that is indicative of a user preference for a driving route of the second vehicle.

18. The communication system of claim 13, wherein the vehicle navigation system adjusts the route responsive to a user input that is indicative of a user preference for a driving route of the second vehicle.

* * * * *

UNITED STATES PATENT AND TRADEMARK OFFICE
CERTIFICATE OF CORRECTION

PATENT NO. : 10,883,846 B2
APPLICATION NO. : 16/110243
DATED : January 5, 2021
INVENTOR(S) : Heinz B. Seifert Page 1 of 1

It is certified that error appears in the above-identified patent and that said Letters Patent is hereby corrected as shown below:

In the Claims

<u>Column 8</u>
Claim 14, Line 43, "of that the first vehicle" should be --of the first vehicle--

Signed and Sealed this
Second Day of February, 2021

Drew Hirshfeld
*Performing the Functions and Duties of the
Under Secretary of Commerce for Intellectual Property and
Director of the United States Patent and Trademark Office*